(No Model.)
H. LUHMANN.
REFRIGERATING APPARATUS FOR COOLING STORAGE BINS, BARRELS, &c.
No. 309,233. Patented Dec. 16, 1884.
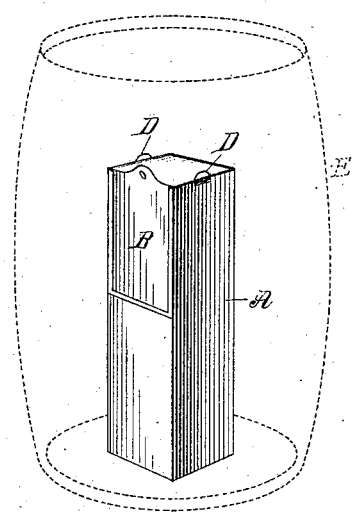
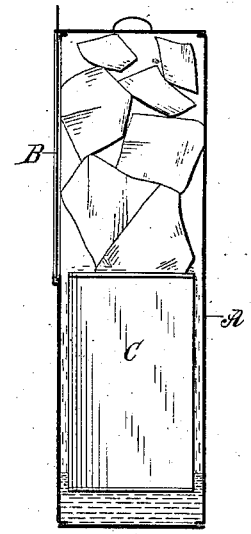
Witnesses:
E. C. Perkins.
A. B. Moore.
Inventor:
Henry Luhmann
By David A. Burr
Attorney

UNITED STATES PATENT OFFICE.

HENRY LUHMANN, OF NEW YORK, N. Y.

REFRIGERATING APPARATUS FOR COOLING STORAGE-BINS, BARRELS, &c.

SPECIFICATION forming part of Letters Patent No 309,233, dated December 16, 1884.

Application filed August 4, 1884. (No model.)

*To all whom it may concern:*

Be it known that I, HENRY LUHMANN, of the city, county, and State of New York, have invented a new and useful Improvement in Refrigerating Apparatus for Cooling Storage-Bins, Barrels, &c.; and I do hereby declare that the following is a full and exact description thereof, reference being had to the accompanying drawings, and to the letters of reference marked thereon, making a part of this specification.

My invention relates to apparatus for cooling the contents of barrels and other receptacles for vegetables, fruits, &c.

It has for its object a convenient portable device, which may be readily inserted into an open barrel or similar receptacle for fresh vegetables and fruits, and which shall, without bringing them into contact with the ice, so cool the temperature within the barrel as to keep them fresh and prevent their wilting.

It consists of a portable metallic vessel adapted to be opened at the top, and within which is fitted a float consisting of an air-tight case, upon which the ice is placed, and whose buoyancy is such that as the ice melts and fills the bottom of the inclosing vessel with water the float borne upward thereon shall keep the ice above the water and in the upper portion of the vessel, where its refrigerative action will be most effective.

In the accompanying drawings, Figure 1 is a view in perspective of my refrigerating-vessel, the dotted lines indicating a barrel whose contents are to be kept cool, and Fig. 2 is a vertical section of the vessel, the float being shown in elevation.

The apparatus is constructed of a comparatively high and narrow metallic case, A, which may be of any desired form in cross-section, and which is fitted at its upper end with a door, B, closing the same. This door B may be fitted at one side of the vessel to open and close by sliding, as illustrated in the drawings, or may be hinged or otherwise made to close over the top, as a lid or cover.

Within the outer vessel, A, an air-tight case or float, C, is loosely fitted, so as to play freely up and down therein, with its upper surface at about a right angle with the sides of the vessel. The dimensions of this air-tight case C are such that it will have sufficient buoyancy to float and uphold the amount of ice which may be stored above it within the vessel A, and the dimensions of this outer vessel are adapted to permit it to be inserted within a barrel, E, (see dotted lines, Fig. 1,) or other form of receptacle used for the storage of articles requiring to be kept cool and fresh, and yet leave ample space for said articles around and above it.

The vessel A may be fitted with bails or ears D, for convenience of handling.

In the use of the apparatus the space in the vessel A above the float C is filled with ice and the vessel closed and placed within the barrel E or other receptacles containing fruits, vegetables, or other articles to be kept fresh and cool. As the ice melts, the water therefrom dripping to the bottom of the vessel will cause the float C to rise, and the ice will thus be automatically kept, until all melted, in constant contact with the top of the vessel A, where it will do most good.

I claim as my invention—

The refrigerating apparatus consisting of a water-tight metallic vessel adapted to be opened at the top, in combination with an air-tight case fitted therein to serve as a float, substantially in the manner and for the purpose herein set forth.

In testimony whereof I have signed my name to this specification in the presence of two subscribing witnesses.

HENRY LUHMANN.

Witnesses:
A. B. MOORE,
D. A. BURR.